US006813614B2

(12) United States Patent
Cordery

(10) Patent No.: US 6,813,614 B2
(45) Date of Patent: *Nov. 2, 2004

(54) METHOD FOR RE-KEYING POSTAGE METERING DEVICES

(75) Inventor: Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 252 days.

This patent is subject to a terminal disclaimer.

(21) Appl. No.: 09/992,851

(22) Filed: Nov. 19, 2001

(65) Prior Publication Data

US 2003/0097336 A1 May 22, 2003

(51) Int. Cl.$^7$ .............................................. G06F 17/60
(52) U.S. Cl. ............................ 705/60; 705/62; 705/63; 705/65; 705/400; 705/401; 705/402; 705/403; 705/404; 705/405; 705/406; 705/407; 705/408; 705/409; 705/410
(58) Field of Search ............................. 705/60, 62, 63, 705/65, 400–410

(56) References Cited

U.S. PATENT DOCUMENTS 5,586,036 A * 12/1996 Pintsov ...................... 705/408
5,748,740 A * 5/1998 Curry et al. ................... 705/65
5,764,772 A * 6/1998 Kaufman et al. ............. 380/30
5,953,424 A * 9/1999 Vogelesang et al. ........ 713/169
6,041,317 A * 3/2000 Brookner ..................... 705/61
6,480,831 B1 * 11/2002 Cordery et al. ............... 705/60

FOREIGN PATENT DOCUMENTS

WO    WO 01/74005 A1 * 10/2001    .............. H04I/9/08

OTHER PUBLICATIONS

Schneider, Michael L. "Processing a secure message on the Internet." Journal of Lending & Credit Risk management. v79n10. PP 58–63. Jun. 1997. DIALOG.*

* cited by examiner

Primary Examiner—James P. Trammell
Assistant Examiner—James A. Reagan
(74) Attorney, Agent, or Firm—Steven J. Shapiro; Angelo N. Chaclas

(57) ABSTRACT

A method for communicating a re-keying message from a postage meter to a registration authority includes the steps of determining at the postage meter that a current key needs to be replaced with a new key; generating in the postage meter the new key; creating in the postage meter the re-keying message, the re-keying message including at least a device identifier and the new key; using the postage meter for printing the re-keying message in a machine-readable form on a recording medium; and mailing the recording medium to the registration authority.

20 Claims, 3 Drawing Sheets

METHOD FOR RE-KEYING POSTAGE METERING DEVICES

BACKGROUND OF THE INVENTION

In today's environment many devices uses cryptographic techniques for ensuring the secure communication of data. One such device is a postage meter that prints an indication of value on a mailpiece and includes cryptographic data that is used to verify the authenticity of the indication of value. The cryptography used in each of these devices typically relies on the use of cryptographic keys that are changed on a periodic basis in order to ensure that the security of the cryptographic data being communicated is not compromised. However, when a device generates a new key(s) to replace a previously used key(s), the newly generated key(s) must be provided to all locations where the protected data is sent for decoding and reading.

The above-discussed transmission of the new key data has been accomplished in the past via the electronic communication of the new key data from one device to another. However, in many countries where postage meters are used there is no support of modem-based or other electronic communications to the postage meter. Nevertheless, it is still desirable to re-key the postage evidencing key and other keys used by the meter. Examples of such other keys are communication keys, postage value refill keys, and graphics keys. Therefore, what is needed is a simple and effective method to permit the transfer of newly generated keys from the postage meter to another device or location when the electronic communication of such keys is not possible.

SUMMARY OF THE INVENTION

A method for communicating a re-keying message from a postage meter to a registration authority includes the steps of determining at the postage meter that a current key needs to be replaced with a new key; generating in the postage meter the new key; creating in the postage meter the re-keying message, the re-keying message including at least a device identifier and the new key; using the postage meter for printing the re-keying message in a machine-readable form on a recording medium; and mailing the recording medium to the registration authority.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
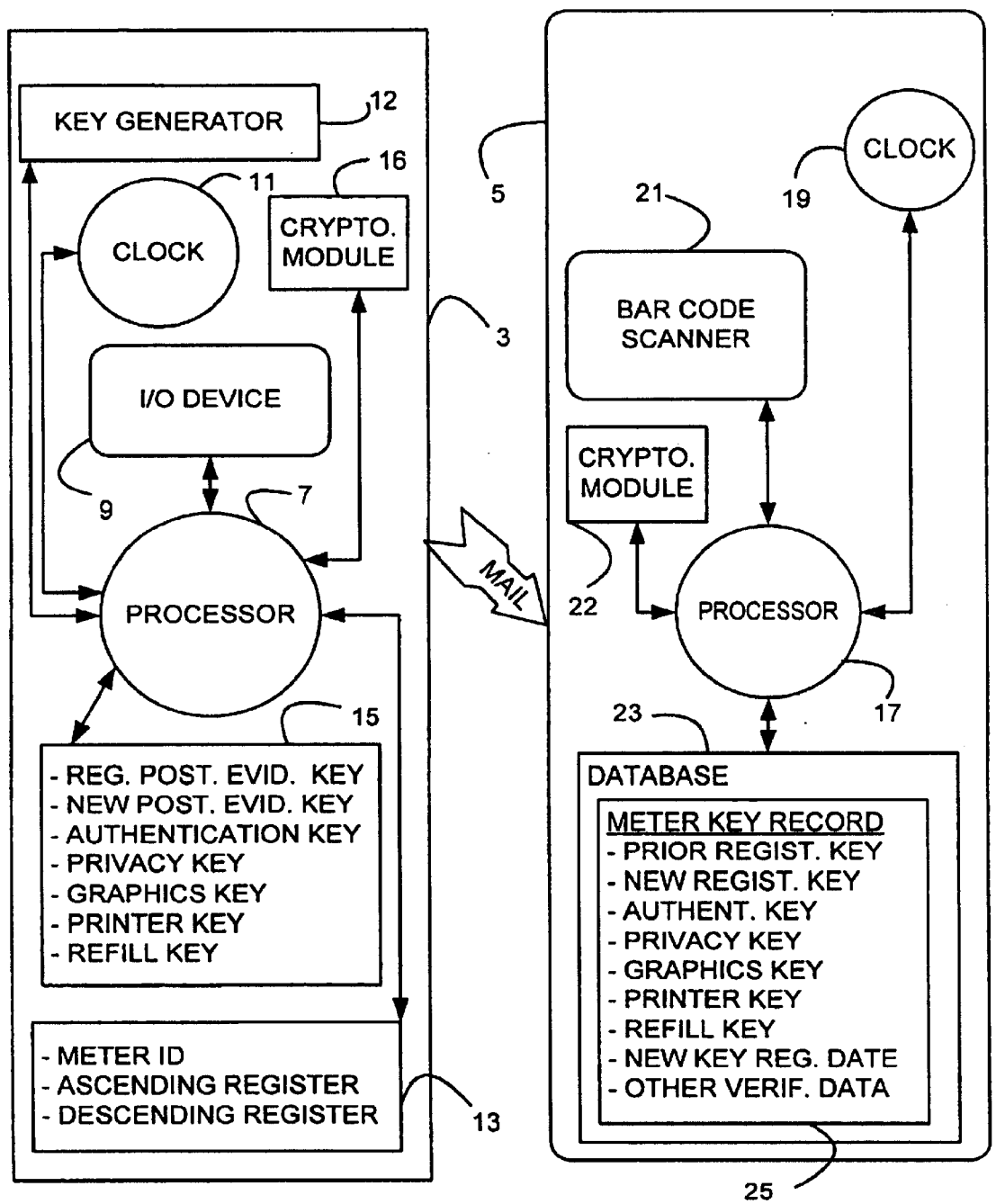
FIG. 1 shows the inventive key transmission system incorporated in a mailpiece delivery system.

FIG. 1 shows a mailpiece delivery system 1 that is utilized to deliver cryptographic keys from a postage meter 3 to a postal data processing center 5. The postage meter 3 can be one of many known postage meters that may include at least one central processor 7, an input/output device 9, a real time clock 11, a cryptographic key generator module 12, first non-volatile memory 13, second non-volatile memory 15 and cryptographic module 16. The cryptographic key generator module 12 is well known in the art and includes a random number generator that is used during the process of new key generation. The input/output device 9 is preferably a keyboard but can be an input/output port such as a serial port. The clock 11 is preferably secured so that the postage meter user cannot arbitrarily change its value. The first NVM 13 is used to store postage meter data such as the postage meter ID, the ascending register value, and the descending register value. The second NVM 15 is used to store all of the cryptographic keys that may be used by the postage meter 3.

The instant invention shall be described with respect to the re-keying of the key that is used in generating a verifiable evidence of postage on a mailpiece. Thus, the meter 3 shall has stored in NVM 15 the currently registered postage evidence key as well as the new postage evidence key that is generated for the re-keying operation discussed in more detail below. In addition to the postage evidencing keys, additional keys such as authentication keys, privacy keys, graphics keys, printer keys, and refill keys may be stored in NVM 15. Since the inventive process can be used for any key that needs to be stored and periodically changed, both the currently registered and new keys for each key type stored in NVM 15.

Since the general operation of postage meters is well known in the art, a detailed description is not considered necessary. It is sufficient for an understanding of the instant invention to recognize that the postage meter 3 is controlled by the processor 7 which maintains a record in NVM 13 of currently existing postage value in the descending register and maintains the running total of all postage value that has been added to the postage meter 3 in the ascending register. When a user of the postage meter 3 requests a certain postage value to be printed as evidence of postage on a mailpiece the processor 7 controls a printer (not shown) to print the evidence of postage and performs the required accounting for the dispensed postage in the descending register. The currently registered postage evidence key is used by the postage meter in a conventional manner to produce a cryptographically secure evidence of postage on the mailpiece.

The data processing center 5 can be any postal facility through which the mailpieces generated by the postage meter 3 are processed during their delivery. The data center 5 includes a central processing unit 17, a real time clock 19, a barcode scanner/reader 21, a cryptographic module 22, and a database 23 that includes individual meter records 25. Each postage meter record 25 is for a specific meter ID and securely stores all of the currently registered keys and any new keys that have been submitted to the data center 5 for registration.

Figure 2:
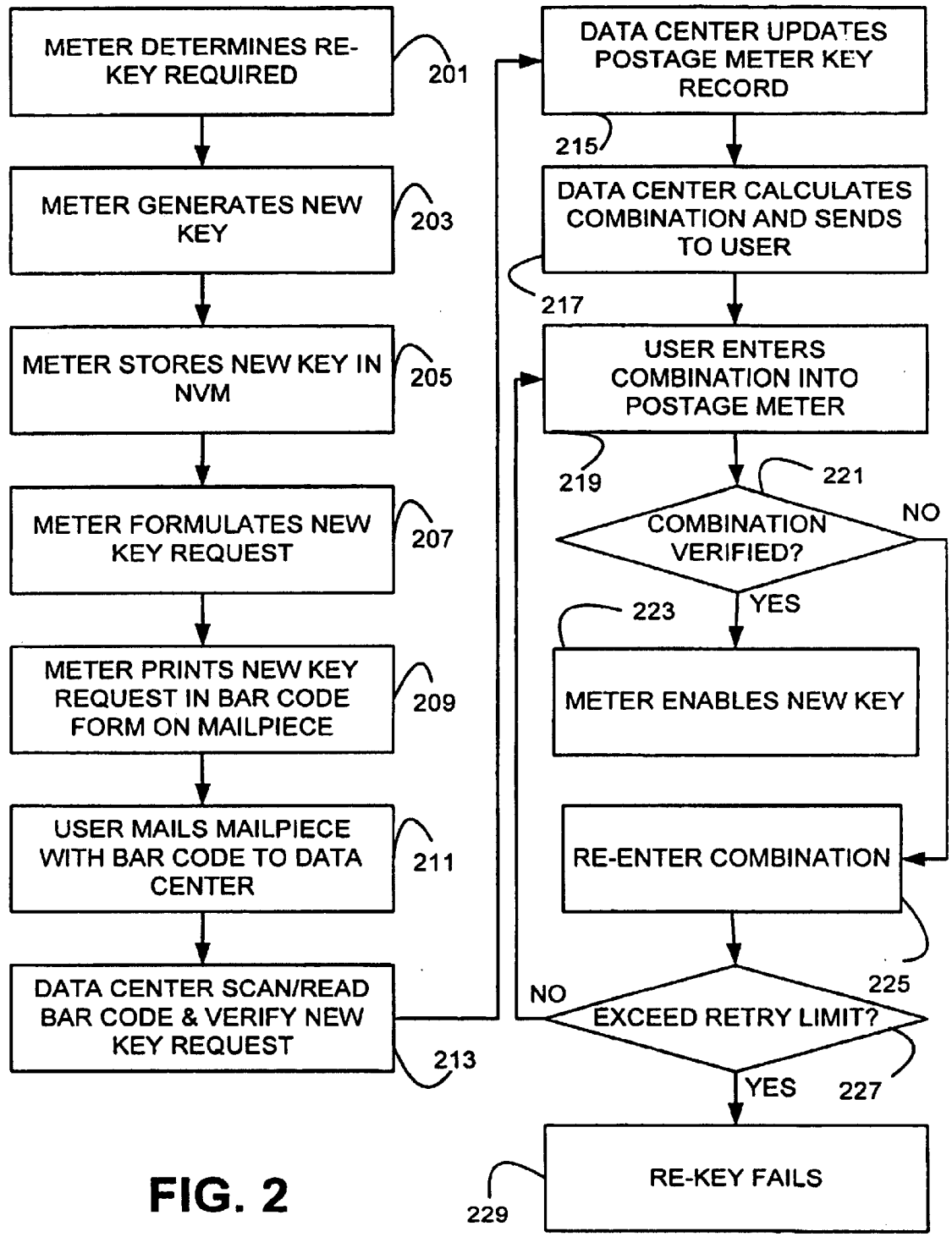
FIG. 2 is a flowchart showing the inventive key transmission system.

Referring to FIGS. 1 and 2, the instant inventive process for re-keying postage meters is discussed below. At step 201 the postage meter 3 determines that the currently registered postage evidence key needs to be replaced. This determination may be based upon the fact that the currently registered postage evidence key is about to expire or because a command has been entered through the I/O device 9 requesting the re-key. The command could be explicit such as when the user presses a re-key button, or implicit in a message received through the I/O device 9 that originated at the data center 5. The postage meter 3 subsequently generates, via the key generator module 12, the new secret key or public key pair as required depending respectively upon whether the cryptographic security is based upon a symmetric secret key system or a public key system (step 203). In either case, the postage meter 3 stores in NVM 15 as the new key (either the secret key or the public key depending upon the underlying cryptographic technology) the new postage evidence key that must be delivered to the data processing center 5 (step 205).

At this point in time, the postage meter 3 formulates a request to register the new postage evidence key. The request includes at least the meter ID and the new postage evidence key (step 207). In the case where a secret key is being sent the request is encrypted using the cryptographic module 16 and a separate privacy key. When a public key is being sent, the encrypting of the request is optional. In any event, the postage meter 3 prints (using a printer not shown) the new key registration request in a machine-readable form on a mailpiece (step 209). The machine-readable form can be, for example, any type of barcode such as the Data Matrix 2D bar code or the PDF-417 symbology.

Figure 3:
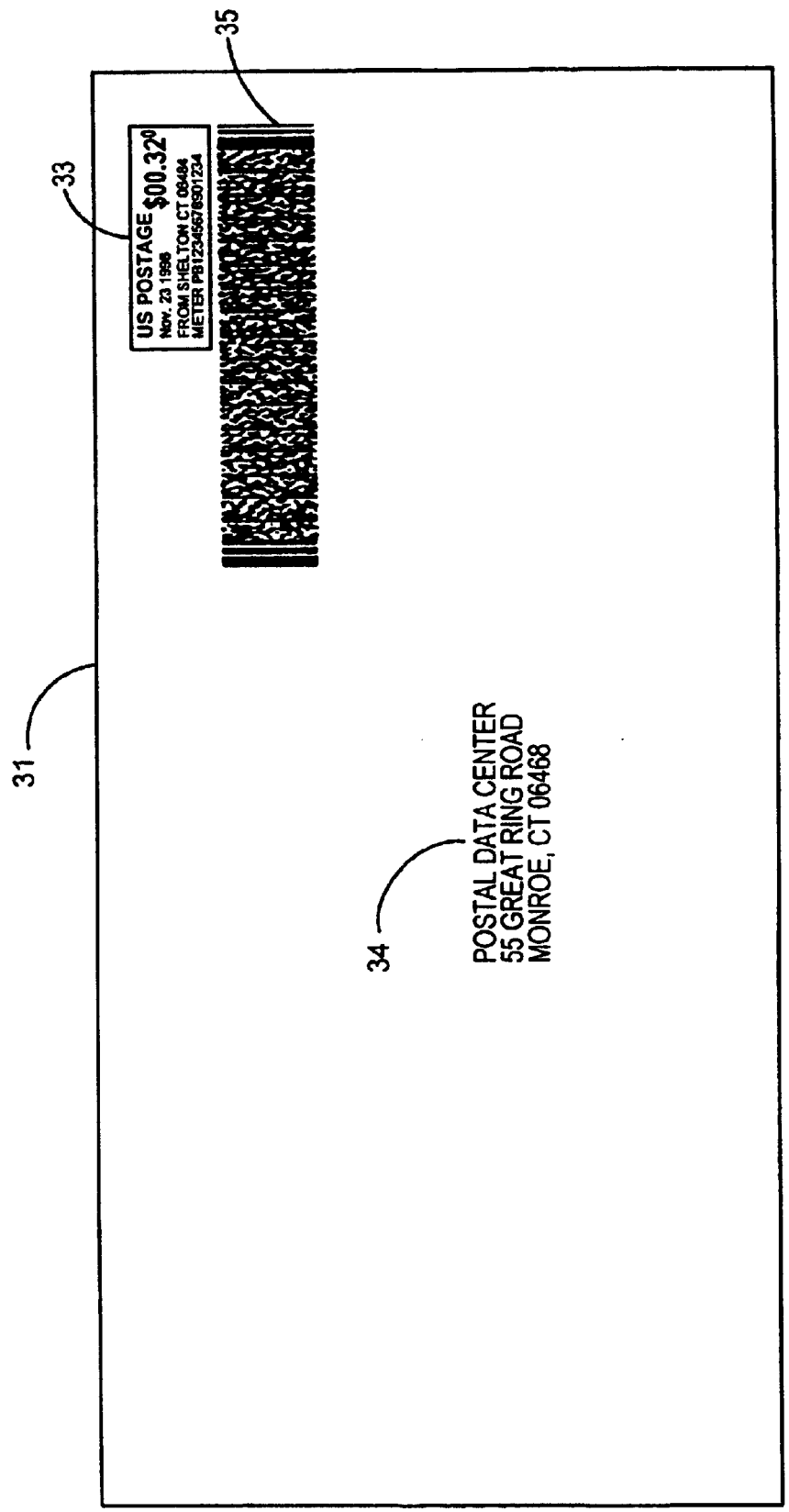
FIG. 3 shows a mailpiece having a new key contained in a bar code.

FIG. 3 shows a mailpiece 31 having an evidence of postage 33 printed thereon, a destination address 34 (such as that of the data center 5) and a barcode 35 containing the new key registration request. The bar code 35 can also include cryptographically secure data that is used to verify the authenticity of the evidence of postage 33 (this is the data for which the postage evidence key is used). Moreover, the bar code 35 can be printed anywhere on the mailpiece 31 and can be separate from a barcode that includes the verifying cryptographically secure data.

Returning to FIG. 2, the mailpiece 31 is submitted into the postal distribution network for delivery to the destination address 34 (step 211). The data center 5 receives the mailpiece 31 and scans and reads the bar code 35 using the bar code scanner/reader 21 to obtain the new key registration request and to verify its authenticity as described further below (step 213). If the new key registration request was sent in the clear, the processor 17 obtains the postage meter ID and the new key and updates the meter key record 25 for the specific postage meter ID to reflect the newly requested postage evidence key (step 215). That is, the data center 5 moves the previously stored new registered key to be stored as the prior registered key and stores the new key as the new registered key. On the other hand if the new key registration request was encrypted, the processor 17 uses the cryptographic module 22 to decrypt the encrypted request in order to obtain the postage meter ID and the new key prior to updating the postage meter record 25.

Once the data center 5 has updated the postage meter record 25, it generates a combination that is sent to the user of the postage meter 3 (step 217). The combination can be sent by mail, phone call or any other available methodology. The combination may be cryptographically derived using a secret combination key known to both the postage meter 3 and the data center 5. The combination may depend upon data from or related to the new key registration request so that the postage meter 3 can verify the combination using well-known cryptographic techniques. That is, the user enters the combination into the postage meter 3 via the input/output device 9 (step 219). The postage meter 3 then attempts to verify that the combination is correct (step 221). If the combination is correct, the postage meter 3 enables use of the new postage evidence key by replacing the currently registered postage evidence key in NVM 13 with the new postage evidence key (step 223). On the other hand, if the verification fails, the combination may be entered again (step 225). However, if the combination fails more than a predetermined number of times (i.e. 3) (step 227), the postage meter 3 deletes the new key from NVM 13 and the re-key effort fails (step 229). Upon the failure of the re-key effort, the postage meter 3 can be rendered inoperable or alternatively it can continue to use the currently registered postage evidence key. In this latter situation, the data processing center 5 would detect that the re-key failed when it receives new mailpieces that use the prior registered postage evidence key. The data center 5 can then initiate an investigation with respect to the specific postage meter 3 whose re-key effort failed.

The description of FIG. 2 set forth the basic elements of the new key registration request. However, additional elements may be added to the request in order to provide additional security and quality checks. For example, the new key registration request may further include a code that is used to authenticate that the new key registration request came from the specifically identified postage meter. The code may be a digital signature (public key system) or a symmetric key message authentication code (MAC) generated using an authentication key.

Further, the request may include a sequential message identification number. The inclusion of such a number helps to identify if a previous new key registration request was lost and also assists in identifying potential replay attacks.

Another item that can be included in the request is a key type identifier. The key type identifier is used where the postage meter 3 uses a plurality of different keys. It identifies which of the plurality of keys is being changed.

The postage meter 3 can also use the real time clock 16 to include in the new key request the date the request was generated. This date is used at the data center 5 to verify the freshness (how current is the date) of the date. The date can also be used at the data center 5 to distinguish between mailpieces that were generated prior to the data center registering the new key and those generated after such registration. This allows the data center 5 to accept mailpieces that used the prior registered key as long as the date in the registration request is before a certain date. The certain date can be the date the data center registered the new key or some date thereafter to account for the time delay associated with the combination code processing.

The new key registration request can also include evidence that the both the new and currently registered keys are actually known by the postage meter 3. This is accomplished by including in the request a MAC or digital signature that is created using the currently registered key and a MAC or digital signature created using the new key.

Finally, meter audit data such as the ascending and descending register values can be included in the request. This audit data is checked against postage meter data residing at the data center 5 to determine if it is consistent with the data center records.

While any and all of the elements discussed above can be included in the request, one skilled in the art will recognize the corresponding data that must be stored at the data center 5 in order to use these elements for verification purposes. For example, appropriate keys and cryptographic algorithms must be stored as well as the audit data and the times associated with the registration of the new keys. Accordingly, at step 213 the verification process includes checking any of the above-mentioned data elements that may be included in the new key registration request.

Additional advantages and modifications will readily occur to those skilled in the art. Therefore, the invention in its broader aspects is not limited to the specific details, and representative devices, shown and described herein.

Accordingly, various modifications may be made without departing from the spirit or scope of the general inventive concept as defined by the appended claims. For example, the bar code could be printed on a card or piece of paper and placed inside of an envelope that is mailed to the data center 5. The card or paper would be removed at the data center and the bar code read.

Additionally, the above-described system reflects that the postage meter 3 stores the new key that is also sent to the data center 5. However, in a public key system the storage of the newly generated public key is not necessarily required. Where public key cryptography is used a key pair consisting of a public and private key are generated in the postage meter 3. The postage meter only uses the private key for producing the evidence of postage and therefore only needs to store this newly generated private key. The newly generated public key is sent in the inventive manner to the data center 5 which will use the public key to verify the evidence of postage on the mailpieces. The process still works the same in that the postage meter 3 receives the combination code which is used to authorize use of the newly generated private key in the meter.

What is claimed is:

1. A method for communicating from a postage meter to a registration authority a re-keying message, the method comprising the steps of:
   determining at the postage meter that a current key needs to be replaced with a new key;
   generating in the postage meter the new key;
   creating in the postage meter the re-keying message, the re-keying message including at least a device identifier and the new key;
   using the postage meter for printing the re-keying message in a machine-readable form on a recording medium; and
   mailing the recording medium to the registration authority.

2. A method as recited in claim 1, wherein the recording medium is a mailpiece.

3. A method as recited in claim 2, wherein the re-keying message is a request to register the new key for use.

4. A method as recited in claim 3, wherein the new key is stored in the postage meter.

5. A method as recited as recited in claim 3 wherein the new key is one of a secret key of a symmetric secret key system and a public key of a public key system.

6. A method as recited in claim 4, further comprising receiving the re-keying message at the registration authority, verifying the authenticity of the re-keying message, and generating a code at the registration authority based on data from the re-keying message which code can be entered into the postage meter to enable use of the new key.

7. A method for communicating from a device to a registration authority a re-keying message, the method comprising the steps of:
   determining at the device that a current key needs to be replaced with a new key;
   generating in the device the new key;
   creating the re-keying message, the re-keying message including at least a device identifier and the new key;
   printing the re-keying message in a machine-readable form on a mailpiece to form a re-keying mailpiece; and
   submitting the re-keying mailpiece to a carrier for delivery to the registration authority.

8. The method as recited in claim 7, further comprising storing the new key in the device.

9. The method as recited in claim 7, wherein the carrier is a postal service.

10. The method as recited in claim 7, wherein the machine-readable form is a bar code.

11. The method as recited in claim 10, further comprising encrypting the re-keying message prior to printing it as a bar code.

12. The method as recited in claim 11, further comprising including as part of the re-keying message an authentication code, a message identification number, a key type indicator, a date of message creation, and device audit data.

13. The method as recited in claim 12, wherein the device is a postage meter.

14. The method as recited in claim 7, further comprising receiving and reading the re-keying message at the registration authority to obtain the device ID and the new key.

15. The method as recited in claim 14, further comprising establishing at the registration authority a device record that includes the device ID, the new key, and the previous key used by the device.

16. The method as recited in claim 14, wherein the re-keying message is a request for authorization to use the new key.

17. The method as recited in claim 12, further comprising verifying the re-keying message at the registration authority and generating a code at the registration authority.

18. The method as recited in claim 17, wherein the code is cryptographically derived based on data from or related to the re-keying message.

19. The method as recited in claim 17, further comprising entering the code into the device thereby enabling use of the new key in the device.

20. The method as recited in claim 7, wherein the device prints an evidence of postage on the mailpiece, generates data that verifies the authenticity of the evidence of postage, and includes the data in the bar code together with the re-keying message.

* * * * *